(12) United States Patent
Dullien

(10) Patent No.: US 6,238,464 B1
(45) Date of Patent: May 29, 2001

(54) METHOD AND APPARATUS FOR SEPARATING DROPLETS FOR PARTICLES FROM A GAS STREAM

(75) Inventor: Francis A. L. Dullien, Drumbo (CA)

(73) Assignees: Dullien Francis A.L., Ontario (CA); Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/308,490

(22) PCT Filed: Oct. 8, 1998

(86) PCT No.: PCT/FR98/02151

§ 371 Date: May 20, 1999

§ 102(e) Date: May 20, 1999

(87) PCT Pub. No.: WO99/19044

PCT Pub. Date: Apr. 22, 1999

(30) Foreign Application Priority Data

Oct. 13, 1997 (FR) .................................................. 97 12867

(51) Int. Cl.[7] .............................. B01D 45/02; B01D 46/24
(52) U.S. Cl. ................................ 95/282; 95/286; 55/304; 55/484; 55/523; 55/DIG. 13; 55/DIG. 42
(58) Field of Search .............................. 55/293, 304, 342, 55/344, 350.1, 421, 440, 484, 523, DIG. 13, DIG. 42; 95/141, 143, 286, 282

(56) References Cited

U.S. PATENT DOCUMENTS

| | | | |
|---|---|---|---|
| 2,829,735 | * | 4/1958 | Kroll . |
| 3,122,430 | * | 2/1964 | Seidel et al. . |
| 3,190,057 | * | 6/1965 | Sinex . |
| 3,240,001 | * | 3/1966 | Kuhn et al. . |
| 3,873,281 | * | 3/1975 | Himes et al. . |
| 4,137,647 | * | 2/1979 | Clark, Jr. . |
| 4,386,947 | * | 6/1983 | Mizuno et al. . |
| 4,437,867 | * | 3/1984 | Lerner . |
| 4,678,487 | * | 7/1987 | Cadwell, Jr. et al. . |
| 4,894,074 | * | 1/1990 | Mizrah et al. . |
| 4,992,084 | * | 2/1991 | Von Blucher et al. . |
| 5,002,597 | * | 3/1991 | Gielow et al. . |
| 5,308,457 | * | 5/1994 | Dall Betta et al. . |
| 5,599,456 | * | 2/1997 | Fanning . |
| 6,080,225 | * | 6/2000 | Forster . |

FOREIGN PATENT DOCUMENTS

| | | | |
|---|---|---|---|
| 0501138 | * | 9/1992 | (EP) . |
| 0612551 | * | 8/1994 | (EP) . |
| 2390193 | * | 12/1978 | (FR) . |
| 9-096209 | * | 4/1997 | (JP) . |
| WO 97/27385 | * | 7/1997 | (WO) . |

* cited by examiner

Primary Examiner—Duane Smith
Assistant Examiner—Fred Prince
(74) Attorney, Agent, or Firm—Antonelli, Terry, Stout & Kraus, LLP

(57) ABSTRACT

A device for separating particles contained in a gas stream and the associated process use a spongy type separator to process gas streams containing liquid or solid particles of a size substantially smaller than one micrometer. The separator is advantageously made of a reticulated foam pierced with channels for the flow of the gas streams.

32 Claims, 2 Drawing Sheets

METHOD AND APPARATUS FOR SEPARATING DROPLETS FOR PARTICLES FROM A GAS STREAM

FIELD OF THE INVENTION

The present invention relates to the field of separators and more specifically to means intended to separate droplets or particles from a gaseous flow, whose size is less than or of the order of one micrometer.

BACKGROUND OF THE INVENTION

Many methods and devices have already been disclosed to that end.

U.S. Pat. No. 5,626,651 describes a process and a system of that type according to which the turbulent gas stream flows above a series of plates defining non turbulent zones where the particles are collected. More precisely, the plates are parallel to each other and vertical. A filtering means made of fibers can also be provided between said plates in order to improve filtration notably of the finer particles.

International patent application WO-95/28,217 describes a device based on the same principle, but according to which the plates are provided with slots or replaced by grates. Frames covered with wire mesh containing a fibrous mat are also used in this prior art.

Furthermore, patent application WO-97/00,102 relates to a separator placed at the exhaust of diesel engines in order to collect the particles contained in the exhaust gas. A honeycomb structure pierced with channels perpendicular to the opening of the honeycomb cells is preferably provided. The porosity of such a structure is of the order of 70%. However, this device cannot be used for fogs because the droplets trapped in the cells cannot be removed by drainage.

International patent application PCT/FR-97/00,164 relating to a separator with one or more vertical drains laterally delimited by fibrous corrugated elements is also known. An agglomerator is also necessarily placed upstream from the separator in order to have larger particles that can be separated at the level of the separator. This is therefore relatively expensive and implies quite significant pressure drops.

However, these well-known means do not allow effective collection and removal of particles and/or droplets smaller than about one micrometer. In U.S. Pat. No. 5,626,651, the particles captured accumulate on the walls, then fall onto the bottom of the device under the effect of gravity. Means intended to shake the walls are often necessary to cause the particles accumulated on the walls to fall. This device poses problems when very fine particles smaller than one micrometer are to be separated. In fact, in this case, the height of the drain must be very limited and the plates must therefore be very high so that the equipment is very bulky for a very small section of flow. The same problem exists in the device according to document WO-95/128,217.

In patent application WO-97/00,102, the particles collected are oxidized.

SUMMARY OF THE INVENTION

The present invention proposes to solve the particle and/or droplet removal problem in an original and unexpected way as explained hereafter.

The present invention advantageously prevents any pressure drop due to the fouling of a zone of the device; the pressure drop remains constant throughout the life of the separator according to the invention.

Furthermore, the present invention allows to obtain a very high separation rate by means of a small equipment with a low pressure loss and continuous running.

The present invention thus relates to a spongy type separator intended to process gas streams containing liquid or solid particles substantially smaller than one micrometer or of the order of one micrometer.

According to the invention, the separator is made of a reticulated foam pierced with channels intended for turbulent flow of the gas streams, said channels being such that the gas streams flow through said foam from one end of the channels to the other.

The porosity of said foam specifically ranges between 90% and 98%, preferably around 97%.

Besides, the size of the cells forming said foam ranges between about 0.5 mm and about 5 mm.

In particular, the diameter of the threads forming said foam ranges between 50 $\mu$m and 1000 $\mu$m.

According to the invention, the diameter of the channels running through said foam ranges between 3 and 100 mm.

According to an aspect of the invention, said foam is made of reticulated polyurethane.

According to another embodiment of the invention, said reticulated foam is made of a vitreous carbon; said foam can also be made from a metal such as aluminium, nickel or lead.

The device can further comprise a means for shaking said foam so as to cause the particles retained in the foam to fall.

According to a preferred use of the invention, the separator can be used to remove liquid droplets such as the oil droplets initially contained in fogs. Said foam then provides regular drainage of the captured droplets.

According to another embodiment of the invention, the device can be used to separate solid particles suspended in a gas.

In other words, the present invention relates to a device intended to separate particles contained in a gas stream, comprising a casing with an inlet and an outlet, at least one straight passageway, totally free, unsealed, open at both ends, intended to allow passage of said gas stream in turbulent state from the inlet to the outlet, a reticulated foam material which defines the walls of said passageways and fills all the space between said passageways, said foam material being made up of threads forming interconnected pores or cells which communicate freely with said passageways so as to create non-turbulent stagnant zones extending away from said passageways.

According to the invention, said particles are collected and deposited on the surfaces of threads forming the reticulated foam material, said threads being spaced apart so that the cells defined thereby allow passage of the turbulent stream over a distance of some cells (from said passageways) and prevent a direct gaseous flow from the inlet to the outlet, the cells forcing the turbulences to decrease in the non-turbulent zones occupying substantially all of the space between the passageways.

According to a characteristic, said passageways all have the same dimensions.

More specifically, the length of the passageways ranges between about 10 cm and about 200 cm.

The adjacent threads are advantageously spaced apart by a distance of about 0.5 mm to about 5 mm in each direction of the space, the peripheral threads and the spaces between said threads defining the walls of said passageways. The particles are deposited on the thread surfaces by inertial impact and by Brownian scattering phenomena.

Furthermore, the diameter of said threads ranges between about 50 μm and about 1000 μm, and the reticulated foam has a porosity ranging between about 90% and about 98%, preferably about 97%.

Besides, said reticulated foam is made of a polyurethane or PVC-coated polyurethane.

According to another possibility, said reticulated foam is made of a vitreous carbon.

According to the invention, said reticulated foam is made of a metal such as aluminium, nickel or lead.

According to another embodiment of the invention, said reticulated foam is made of a ceramic material.

According to yet another embodiment of the invention, said passageways are made by assembly of reticulated foam sheets which form channels of square or rectangular section.

In particular, said passageways are positioned horizontally, and the device allows to remove liquid droplets such as the droplets contained in an oil or water fog, the liquid formed after deposition of the droplets being drained by said foam and continuously discharged from the casing into suitable means placed at the bottom of said casing.

The passageways provided for the gas stream can be positioned horizontally or vertically, and the particles are separated from the gas stream.

The invention also relates to a process for separating particles from a gas stream in which they are contained, comprising the following stages:

passing said gas streams through at least one straight passageway, totally free, unsealed, open at both ends, in a given direction in a casing, above an area where the effluent is non-turbulent and stagnant, consisting of a plurality of interconnected subareas where there is no direct flow and which communicates with the gas stream, and arranging a plurality of surfaces transversely to the direction of flow of the gas stream, said surfaces extending from the passageways and being spaced apart so as to define said interconnected subareas forming the non-turbulent area communicating freely with said passageways, each subarea occupying substantially all of the space between said adjacent surfaces so that the turbulent eddies of gas stream enter said spaces between the surfaces and decay in said subareas, said particles being trapped and deposited mechanically on the surfaces defining the stagnant and turbulent-free subareas.

In a more detailed way, said stagnant and turbulent-free subareas consist of the cells formed by adjacent threads of a reticulated foam which surrounds said passageways, the particles are carried along by the turbulent eddies within said gas stream in the cells between the threads and are deposited on the thread surfaces by inertial impact and by Brownian diffusion mechanisms.

The invention is essentially aimed at particles with a diameter ranging between about 0.01 μm and about 100 μm, and the gas stream has a velocity in he passageways ranging between about 3 and about 20 m/s.

According to a particular feature of the invention, said passageways are made by perforation or by drilling holes through sheets or blocks of a material made from reticulated foam.

Furthermore, said casing is periodically shaken or vibrated so as to cause the dust deposited on said threads of the foam to fall into suitable means placed below the reticulated foam.

BRIEF DESCRIPTION OF THE DRAWINGS

Other features, advantages and improvements according to the invention will be clear from reading the description hereafter, given by way of non limitative example, with reference to the accompanying drawings wherein.

DETAILED DESCRIPTION OF THE INVENTION

Figure 1:
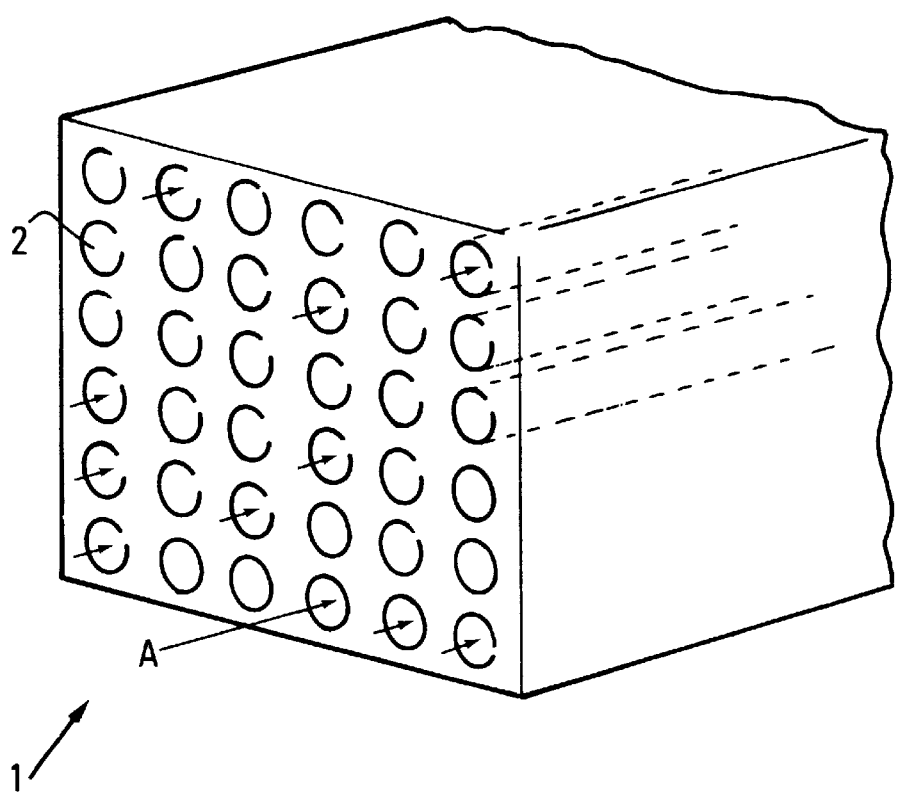
FIG. 1 is a perspective of a part of the separator according to the invention.

FIG. 1 shows a block made of a spongy material 1 according to the invention. The material can advantageously be a reticulated polyurethane foam or a reticulated PVC-coated polyurethane foam, a reticulated vitreous carbon foam or a reticulated foam made from a metal such as aluminium, nickel or lead. A reticulated foam of a ceramic material can also be used without departing from the scope of the invention.

The materials aimed at by the invention consist of small cells, dodecahedral for example, formed by intertwined threads, filaments or fine ligaments. The porosity usually ranges between 90 and 98%. The size of the cells ranges between about 0.5 mm and about 5 mm and the diameter of the threads ranges between 50 μm and 1000 μm. A thread diameter ranging between 50 and 100 μm can sometimes be preferred.

Furthermore, channels 2, preferably parallel to each other, are pierced or drilled through spongy material 1. These channels allow the fluid to flow in the direction shown by arrows A in FIG. 1. The diameter of channels 2 ranges here between 3 and 100 mm. The distance between two channels can range between about 2 mm and about 20 mm.

The cross-section occupied by drain channels 2 is 30 to 70% of the total cross-section of said foam.

The section of the channels is preferably circular as shown in FIG. 1. However, the sections of the channels can have other shapes without departing from the scope of the invention.

The general layout of the channels can be such as to form a grid pattern of parallel channels. However, a network of channels arranged differently can be selected without departing from the scope of the invention.

By way of example, a test has been carried out on the basis of a reticulated polyurethane foam block pierced with 63 channels with each a diameter of about 6 mm and a length of 18 cm. The distance between the channel centers is 12 mm. The rate of collection of particles of about 1.5 μm in diameter is then 95%. The flow rate of the effluents is about 30 m³/h and the pressure drop in the device is of the order of 0.75 kPa. This pressure drop can be even lower by increasing the to length of the channels and their diameter by the same factor while keeping the same rate of collection.

Another example relative to the invention relates to the separation of a water fog with particles of about 30 μm in diameter in an air stream. A reticulated polyurethane foam with a cell size of about 0.5 mm is used. This foam is pierced with 162 circular horizontal 34-cm long channels with a diameter of about 1 cm (distance between centers 1 cm). The velocity of the air in the channels is about 7 m/s with a pressure drop of about 0.3 kPa. A rate of collection of about 99.98% has thus been obtained.

In the field of separation of droplets forming a fog, the present invention has the advantage of draining the droplets which thus form a liquid that flows by gravity through the reticulated spongy material.

Figure 2:
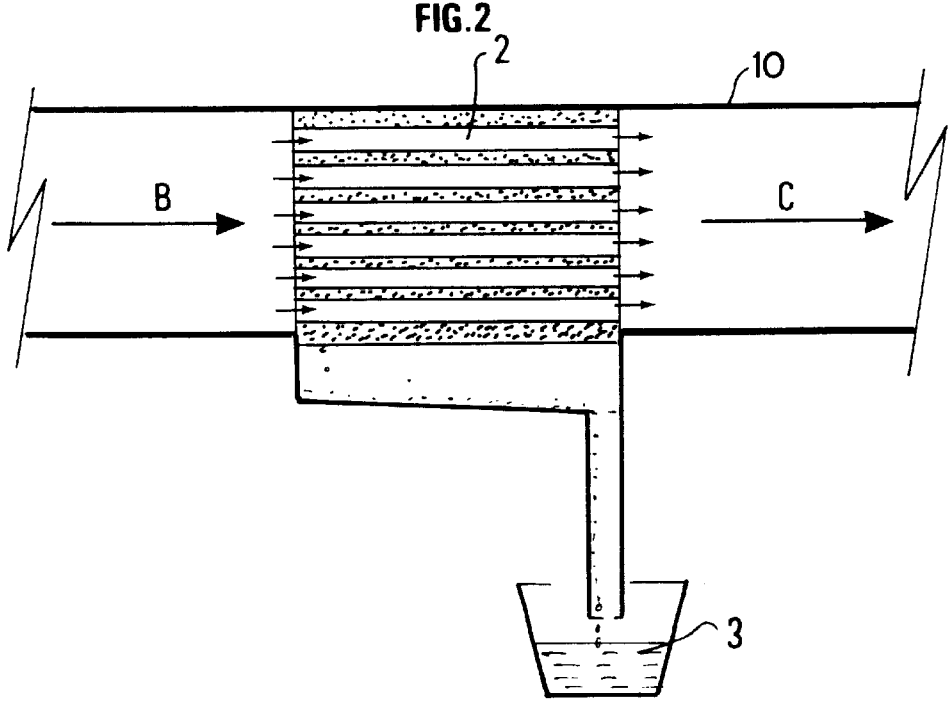
FIG. 2 is a diagrammatical lengthwise section of an embodiment of the invention.

An application example is illustrated by FIG. 2 which relates to a viscous fog separator in lengthwise section.

A mixture of gas and of oily fog flows in the direction shown by arrow B in FIG. 2 into an enclosure 10 containing the spongy material.

The mixture flows through all the channels 2 pierced through the spongy material and leaves enclosure 10 in the direction shown by arrow C at the other end of channels 2. The drainage obtained according to the invention allows the oil to be collected at the bottom of enclosure 10. This oil can itself be discharged and stored in a tank or in any other specific means such as 3. The oil captured by the threads forming the spongy material thus flows to the bottom of the device substantially at the same flow rate as when it is absorbed.

In other words, the spongy material is saturated with liquid over a limited height, corresponding to the rate of absorption of the threads of the spongy material, limited by the allowed discharge rate.

Separation of an oily fog with particles having a diameter of about 1 $\mu$m has been performed in an air stream a reticulated polyurethane foam whose cell size is about 0.5 mm is used. This foam is pierced with 162 horizontal 68-cm long channels with a diameter of about 1 cm (distance between centres 1 cm). The velocity of the air in the channels is about 10 m/s. A pressure drop of the order of 1.8 kPa is measured and a rate of collection of 96% is obtained.

In relation to separators made up of fibrous mats or others, the present invention allows to do without a frame or any other element intended to support the mat since the spongy material according to the invention is initially rigid enough to be perforated by any means known in the art. Furthermore, a high drilling precision can be obtained.

The device according to the invention is suited for separation of gas stream fumes. Deposition then occurs on the threads of the reticulated foam where a solid or bituminous layer forms.

The particles being present in low concentrations, cleaning and/or changing of the foam is very little frequent.

Furthermore, without departing from the scope of the invention, the reticulated foam according to the invention can be washed when it is dirty and put back in place when clean.

The device according to the invention is also suited for separation of industrial dust. In this case, the channels are preferably positioned vertically so that the dust deposited on the threads can be removed therefrom by vibrating the device. The dust thus falls by gravity into the channels in which flow is stopped during cleaning.

Another example relating to the fumes coming from a FCC catalyst is given: the particles are about 6 $\mu$m in diameter. The foam is made of reticulated ceramic with cells of about 2 mm. 88 circular channels, either horizontal or vertical, with a diameter of about 1.3 cm, run through said foam from one end to the other. The distance between centres of the channels is about 1.3 cm. Three foam portions of about 23 cm each are arranged in series (total length of about 70 cm). The velocity of the air in the channels is about 7 m/s and a pressure drop of about 0.25 kPa has been measured. A rate of collection of about 94% has thus been obtained according to this example.

Figure 3:
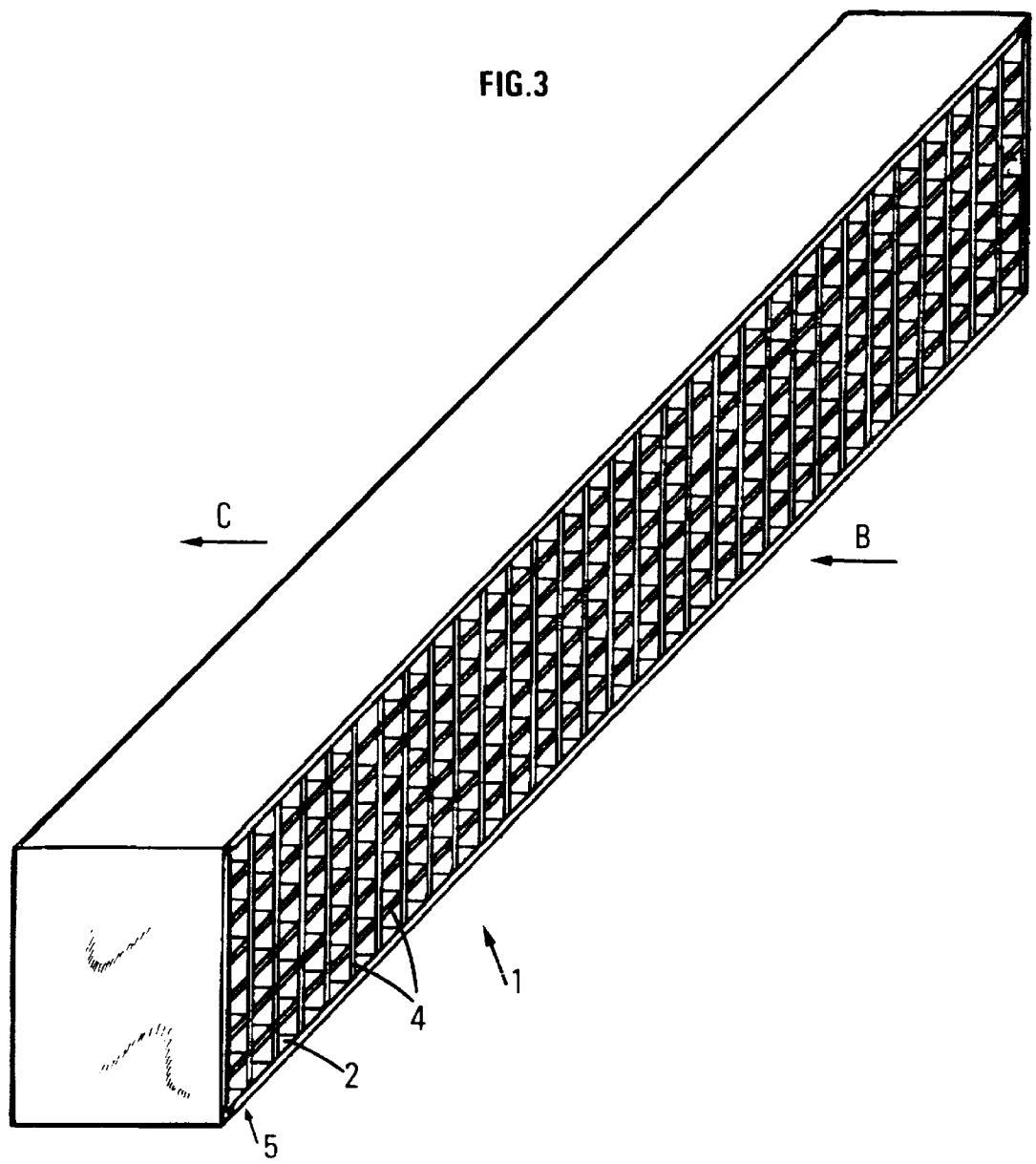
FIG. 3 is a simplified perspective of another embodiment of the invention.

Without departing from the scope of the invention, a device such as that diagrammatically shown in FIG. 3 can be used.

The separator consists here of an assembly of sheets or plates 4 of reticulated foam forming a grid pattern through which the effluents to be processed flow. The plates are contained in a casing 5.

As in the previous embodiments of the invention, the effluents to be processed flow in as shown by arrow B, flow through channels 2 from one end to the other and flow out as shown by arrow C.

According to an application example, the sides of the squares of the grid pattern are 1.25 cm long. The foam plates are about 3 mm thick. The foam is a nickel foam with 30 and 40 cells (or pores) per inch. The size of the cells is of the order of 0.75 mm with threads of about 50 $\mu$m in diameter.

The grid pattern can also consist of rectangles or of other geometric shapes obtained from intertwined reticulated foam plates 4.

According to this example, the channels are 18 cm long. The separator is 11.5 cm high and 49.5 cm long (front view). FIG. 3 globally illustrates this geometry.

What is claimed is:

1. A separator intended for processing of gas streams containing liquid or solid particles substantially smaller than one micrometer or of the order of the one micrometer, comprising reticulated foam delimiting channels intended for turbulent flow of the gas streams, said channels being such that the gas streams flow through said foam from one end of the channels to the other, wherein said foam includes cells adjacent said channels forming stagnant and turbulent-free subareas into which said liquid or solid particles carried by eddies of the gas streams are deposited.

2. A separator as claimed in claim 1, characterized in that the porosity of said foam ranges between 90% and 98%.

3. A separator as claimed in claim 1, characterized in that a size of the cells ranges between about 0.5 mm and about 5 mm.

4. A separator as claimed in claim 1, characterized in that said foam comprises threads having diameters ranging between 50 $\mu$m and 1000 $\mu$m.

5. A separator as claimed in claim 1, characterized in that said channels running through said foam have a diameter which ranges between 3 and 100 mm.

6. A separator as claimed in claim 1, characterized in that said foam comprises a reticulated polyurethane.

7. A separator as claimed in claim 1, characterized in that said reticulated foam comprises a vitreous carbon.

8. A separator as claimed in any one of claim 1, characterized in that said reticulated foam comprises a metal.

9. A separator as claimed in claim 1, further comprising means for shaking said foam in order to cause the particles deposited in said foam to fall.

10. A separator as claimed in claim 2, characterized in that the porosity of said foam is around 97%.

11. A separator as claimed in claim 8, characterized in that said reticulated foam comprises a metal selected from the group consisting of aluminum, nickel and lead.

12. A device intended for separation of particles contained in a gas stream, comprising a casing with a n inlet and an outlet, at least one straight passageway totally free, unsealed, open at both ends and intended to allow passage of said gas stream in turbulent state from the inlet to the outlet, a foam material which defines the walls of said at least one straight passageway, said foam material comprising threads forming interconnected pores or cells that communicate freely with said at least one straight passageway so as to create non-turbulent stagnant zones which extend away from said at least one straight passageway, characterized in that said particles are collected and deposited on the surface of the threads forming the foam material, said threads being spaced apart so that the cells defined thereby allow passage of the turbulent stream over a distance of some cells from said at least one straight passageway, but prevent a direct gaseous flow from the inlet to the outlet, the cells forcing turbulence s to decrease in the non-turbulent zones.

13. A device as claimed in claim 10, characterized in that a plurality of straight passageways are provided and in that said foam material fills all of the space between passageways.

14. A device as claimed in claim 10, characterized in that said foam material is a reticulated foam material.

15. A device as claimed in claim 13, characterized in that said passageways all have the same dimensions.

16. A device as claimed in claim 13, characterized in that a length of said passageways ranges between about 10 cm and about 200 cm.

17. A device as claimed in claim 12, characterized in that t he adjacent threads are spaced apart by a distance of about 0.5 mm to about 5 mm in each direction of the space, peripheral threads and the spaces between said peripheral threads defining the walls of said at least one straight passageway, and in that the particles are deposited on the surfaces of the threads by inertial impact and by Brownian scattering phenomena.

18. A device as claimed in claim 14, characterized in that the diameter of said threads ranges between about 50 $\mu$m and about 1000 $\mu$m, and a porosity of the reticulated foam ranges between about 90 and 98%.

19. A device as claimed in claim 14, characterized in that said reticulated foam comprises of a polyurethane or a PVC-coated polyurethane.

20. A device as claimed in claim 18, characterized in that said reticulated foam comprises a vitreous carbon.

21. A device as claimed in claim 14, characterized in that said reticulated foam comprises a metal.

22. A device as claimed in claim 14, characterized in that said reticulated foam comprises a ceramic material.

23. A device as claimed in claim 13, characterized in that said passageways are made by assembly of reticulated foam sheets forming channels of square or rectangular section.

24. A device as claimed in claim 13, characterized in that said passageways are positioned horizontally, whereby liquid droplets can be removed from the gas stream, liquid formed after deposition of the droplets being drained by said foam and continuously discharged from said casing into a tank placed at the bottom of said casing.

25. A device as claimed in claim 14, characterized in that said passageways are positioned vertically.

26. A device as claimed in claim 18, characterized in that the porosity of said foam is around 97%.

27. A device as claimed in claim 21, characterized in that said reticulated foam comprises a metal selected from the group consisting of aluminum, nickel and lead.

28. A process for separating particles from a gas stream in which they are contained, comprising the following stages:
passing said gas streams through at least one straight passageway, and
arranging a plurality of surfaces transversely to the direction of flow of the gas stream, said surfaces extending from said at least one straight passageway and being spaced apart so as to define a plurality of interconnected subareas forming together a stagnant and non-turbulent area communicating freely with said at least one straight passageway, each subarea occupying substantially all of the space between adjacent surfaces so that turbulent streams of the gas stream enter said spaces between the surfaces and decay in said subareas, said particles being trapped and deposited mechanically on the surfaces defining the stagnant and non-turbulent area.

29. A process as claimed in claim 28, characterized in that said stagnant and non-turbulent area comprise cells formed by adjacent threads of a reticulated foam which surrounds said at least one straight passageway, the particles being carried along by turbulent eddies within said gas stream in the cells between the threads and deposited on the thread surfaces by inertial impact and by Brownian diffusion mechanisms.

30. A process as claimed in claim 28, characterized in that the diameter of said particles ranges between about 0.01 $\mu$m and about 100 $\mu$m, and the velocity of the gas stream ranges between about 3 and about 20 m/s in said at least one straight passageway.

31. A process as claimed in claim 28, characterized in that said at least one straight passageway is mad e by perforation or by drilling at least one hole through sheets or blocks of a reticulated foam material.

32. A process as claimed in claim 28, characterized in that said casing is periodically shaken or vibrated so as to cause the particles deposited on said threads to fall from the foam into a tank placed below the reticulated foam.

* * * * *